US008154392B2

(12) United States Patent
Cathcart

(10) Patent No.: US 8,154,392 B2
(45) Date of Patent: Apr. 10, 2012

(54) APPARATUS THAT PREPARES AND DELIVERS INTELLIGIBLE INFORMATION TO THE HUMAN BRAIN BY STIMULATING THE SENSE OF TOUCH IN INTELLIGIBLE PATTERNS WITHIN AN AREA OF SKIN

(76) Inventor: Aaron Renwick Cathcart, Franklinton, LA (US)

( * ) Notice: Subject to any disclaimer, the term of this patent is extended or adjusted under 35 U.S.C. 154(b) by 462 days.

(21) Appl. No.: 12/249,835

(22) Filed: Oct. 10, 2008

(65) Prior Publication Data

US 2010/0090812 A1 Apr. 15, 2010

(51) Int. Cl.
*H04B 3/36* (2006.01)

(52) U.S. Cl. .................................. 340/407.1; 340/407.2

(58) Field of Classification Search ............... 340/407.1, 340/407.2

See application file for complete search history.

(56) References Cited

U.S. PATENT DOCUMENTS 3,736,551 A * 5/1973 Hirsch .......................... 367/134
4,217,684 A * 8/1980 Brisken et al. ............... 29/25.35
6,181,237 B1 * 1/2001 Gehlot ....................... 340/407.1
6,326,901 B1 * 12/2001 Gonzales ....................... 340/7.2
6,344,795 B1 * 2/2002 Gehlot .......................... 340/540
6,930,590 B2 * 8/2005 Ling et al. .................. 340/407.1
7,046,151 B2 * 5/2006 Dundon ..................... 340/573.1
2003/0227374 A1 * 12/2003 Ling et al. .................. 340/407.1

* cited by examiner

*Primary Examiner* — Travis Hunnings

(57) ABSTRACT

The apparatus is typically constructed within a sock or shoe and interfaces the output of a source system/systems (not part of this invention and hereinafter referred to as "the source system" or "the source systems") with an area of touch sensitive skin. Being a receiving, processing, interfacing and delivering apparatus, the uses of the apparatus are limited only by the imagination of those who invent the source systems. By using the wearer's sense of touch to convey information to the brain, outdoorsmen and soldiers can be kept constantly aware of the direction of north while keeping their eyes, ears, nose, mouth, and hands focused and dedicated to other tasks. The apparatus consists of a connection between the source system and the electronics which prepares and delivers the intelligible information to a touch inducer pad which is directly or indirectly, via an intermediate material, in contact with an area of touch sensitive skin specifically including but not limited to a bottom of a foot. A typical application is to electrically stimulate a point on the bottom of the foot and then move that point repeatedly through the center of the touch inducer pad in the direction of north.

2 Claims, 6 Drawing Sheets

Figure 1:
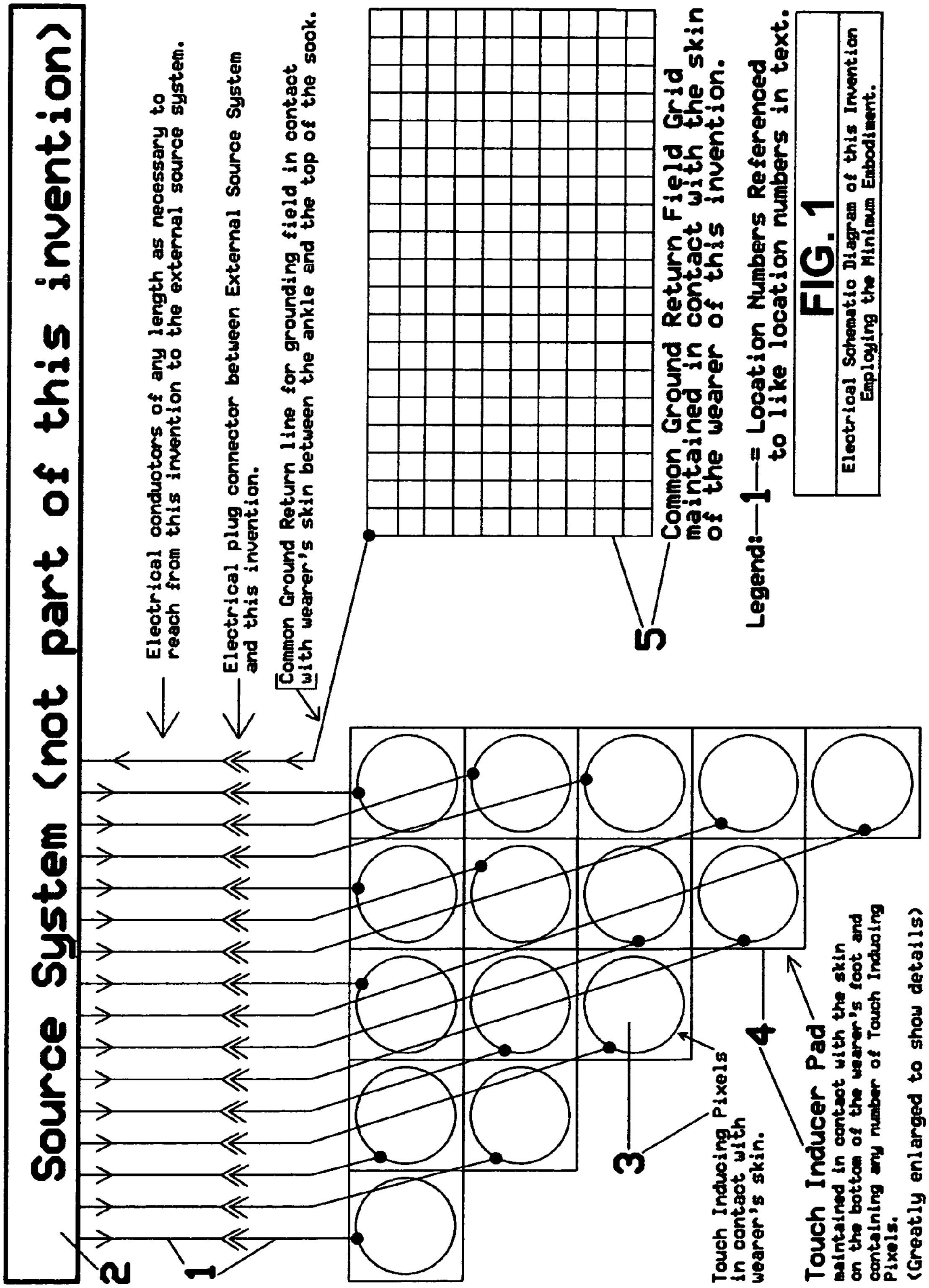

Electrical Schematic Diagram of this Invention Employing the Minimum Embodiment.

Simplified Block Diagram of this Invention Employing the Preferred Embodiment

Detail Block Diagram of this Invention Employing the Preferred Embodiment

Detail Block Diagram of this Invention Employing the Preferred Embodiment

Depiction of the Completed Construction Employing the Preferred Embodiment

THE COMPLETED CONSTRUCTION OF THIS APPARATUS IS INTENDED TO BE INCONSPICUOUS.

Depiction of the Completed Construction Employing the Alternative Embodiment

THE COMPLETED CONSTRUCTION OF THIS APPARATUS IS INTENDED TO BE INCONSPICUOUS.

APPARATUS THAT PREPARES AND DELIVERS INTELLIGIBLE INFORMATION TO THE HUMAN BRAIN BY STIMULATING THE SENSE OF TOUCH IN INTELLIGIBLE PATTERNS WITHIN AN AREA OF SKIN

BACKGROUND OF THE INVENTION

In 1821 Louis Braille devised a means for the blind to read by using their sense of touch in their fingers. This means of touch communications continues to be widely used by the blind. Since the invention of the Braille system of touch communications, no invention has resulted in an apparatus that has successfully exploited a wearer's sense of touch as a practical means of communications, that is commonly available to; and, economically affordable by an average person.

DEFICIENCIES SOLVED BY THE INVENTION

1. Other efforts to use the wearer's sense of touch to deliver intelligible information to a human brain have many deficiencies, specifically including but not limited to:
   - A. failure to provide for the tracing of images on a wearer's sense of touch in the skin, which is of key importance in that an insect on a person's skin cannot be felt until the insect moves and traces a path on the wearer's sense of touch in the skin,
   - B. failure to provide for interference free delivery of the desired information,
   - C. failure to provide for an interface with a source system external to the invention,
   - D. failure to provide for error free delivery of the desired information,
   - E. failure to provide for the capability of preventing crosstalk and mutual interference between or among a plurality of wearer's of the invention who are in close proximity to each other,
   - F. failure to provide the wearer with a means of correcting crosstalk and mutual interference between or among a plurality of wearer's of the invention who are in close proximity to each other,
   - G. failure to provide each wearer with a unique wearer's address code to facilitate positive confirmation and identification of each wearer,
   - H. failure to provide each wearer with the capability to set his/her touch stimulation intensity,
   - I. failure to provide each wearer with the capability to set his/her maximum reading speed,
   - J. failure to provide for a buffer to facilitate the setting of the wearer's maximum reading speed,
   - K. failure to provide for augmenting the internal operating power supply with an optional augmenting external power supply,
   - L. failure to employ the most recent state-of-the-art electronic capabilities, components, and construction,
   - M. failure to facilitate inconspicuous construction for use in covert operations; and,
   - N. failure to facilitate use by a large number of wearer's in close proximity to each other as in hunting groups and combat operations.
2. The invention solves each of the preceding deficiencies, as well as other unspecified deficiencies, by providing for many functions and capabilities, specifically including but not limited to:
   - A. employing the technique of tracing the image on the wearer's sense of touch in the skin,
   - B. avoiding accidental and/or intentional interference and/or jamming of the wireless communications link between the source system and the invention,
   - C. accommodating the interface of the invention with the source system regardless of the intelligible information that the source system is designed to deliver,
   - D. ensuring error free delivery of the intended information by providing for error free receipt confirmation commands or error correction by request to retransmit commands,
   - E. employing a wearer's address comparator and gate to ensure that only the intelligible information addressed to the intended wearer is received by that intended wearer,
   - F. providing the wearer with the capability to select and set his/her personal and unique wearer's address code,
   - G. providing confirmation that the error free receipt confirmation commands and the request to retransmit commands are in fact originated by the intended wearer by way of including the unique wearer's address code along with the error free receipt confirmation commands and the request to retransmit commands,
   - H. providing the wearer with the capability to select and set his/her touch stimulation intensity to suit their personal preference,
   - I. providing the wearer with the capability to select and set his/her maximum reading speed to suit their personal reading skill,
   - J. providing for a store and forward buffer to facilitate the capability for the wearer to select and set his/her maximum reading speed to suit their personal reading skill,
   - K. providing the capability for an optional augmenting external power supply to augment and/or recharge the power supply contained within the invention,
   - L. employing state-of-the-art electronic capabilities and components, specifically including but not limited to microchip gates with each having its own unique pixel address coded number which makes it possible to address and deliver the touch inducing signal to a touch inducing pixel at a specified time, for a specified duration, and at a specified intensity from a bus common to all the inputs of all pixel gates and their respective touch inducing pixels,
   - M. capability of, and procedure for, constructing the invention in a secret and hidden manner that is virtually undetectable, in order to accommodate its use in covert operations; and,
   - N. capability for a large number of wearer's to use the invention in very close proximity to each other and in hostile environments such as encountered by soldiers in combat.

OBJECTIVES OF THE INVENTION

The objectives of the invention is to facilitate the visualization and interpretation by the human brain of images delivered to the wearer's sense of touch in an area of touch sensitive skin, sometimes hereinafter referred to as "said skin"; with the preferred said skin being the skin on the portion of the bottom of the human foot that lies beneath the arch of the foot and to do that by providing an apparatus that can interface the wearer's sense of touch in said skin with the compatibly formatted intelligible output of the source systems having a need to deliver its intelligible output to the wearer's sense of touch in said skin for visualization and interpretation by the human brain. Additionally, it is the objective of the invention to exploit the wearer's sense of touch as a practical means of communications by providing an economically affordable apparatus for sale to the average person and an enhanced more expensive version for sale to the United States Government and its Armed Forces.

DESCRIPTION OF FIG. 1, FIG. 2, FIG. 3A, FIG. 3B, FIG. 4 AND FIG. 5

1. The apparatus is described in detail in this specification and is illustrated in the accompanying FIG. 1, FIG. 2, FIG. 3A, FIG. 3B, FIG. 4 and FIG. 5 which form a part hereof and wherein:

A. FIG. 1 is an electrical schematic diagram of the invention employing the minimum embodiment.

Figure 2:
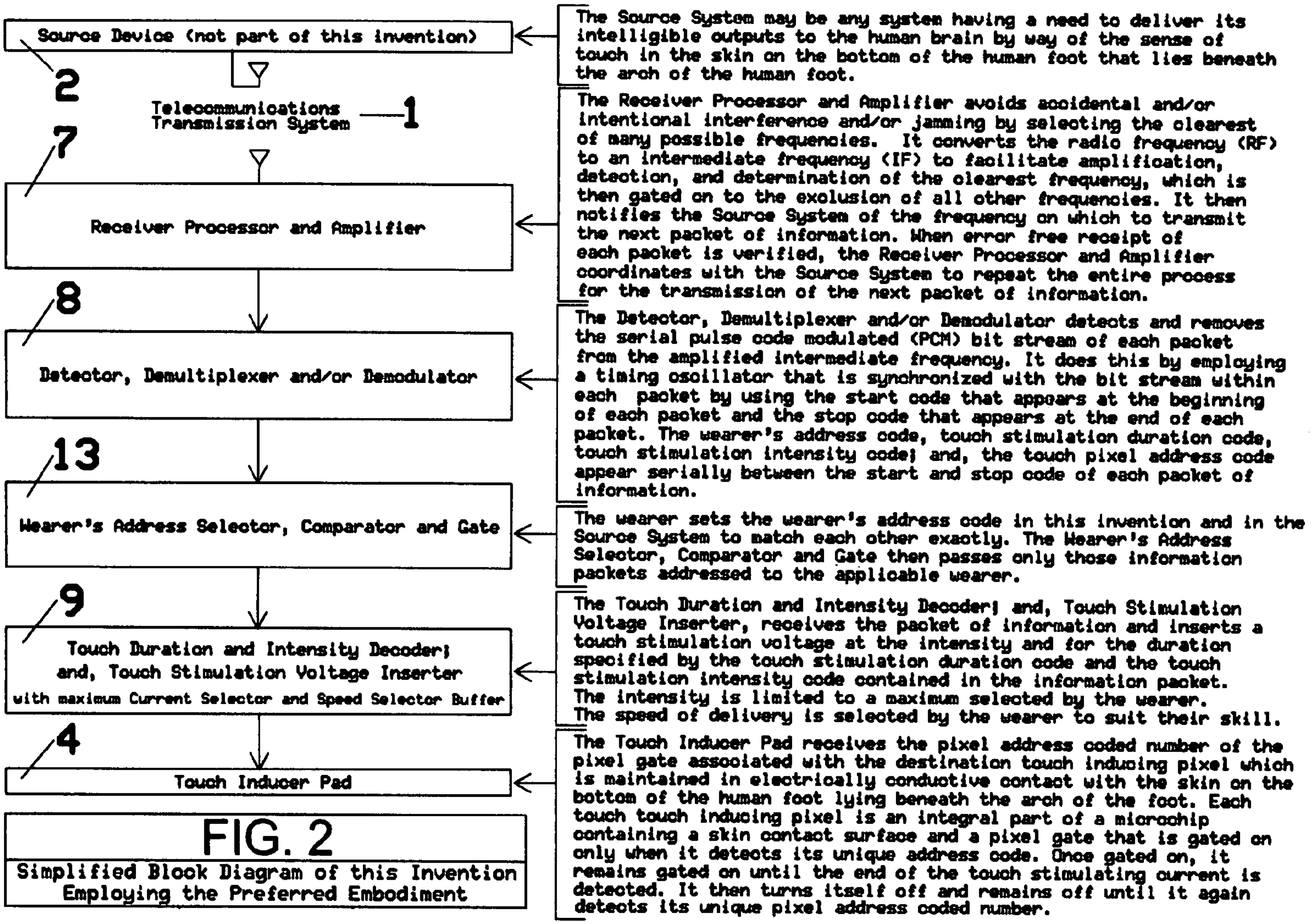

B. FIG. 2 is a simplified electrical block diagram of the invention employing the preferred embodiment.

Figure 3A:
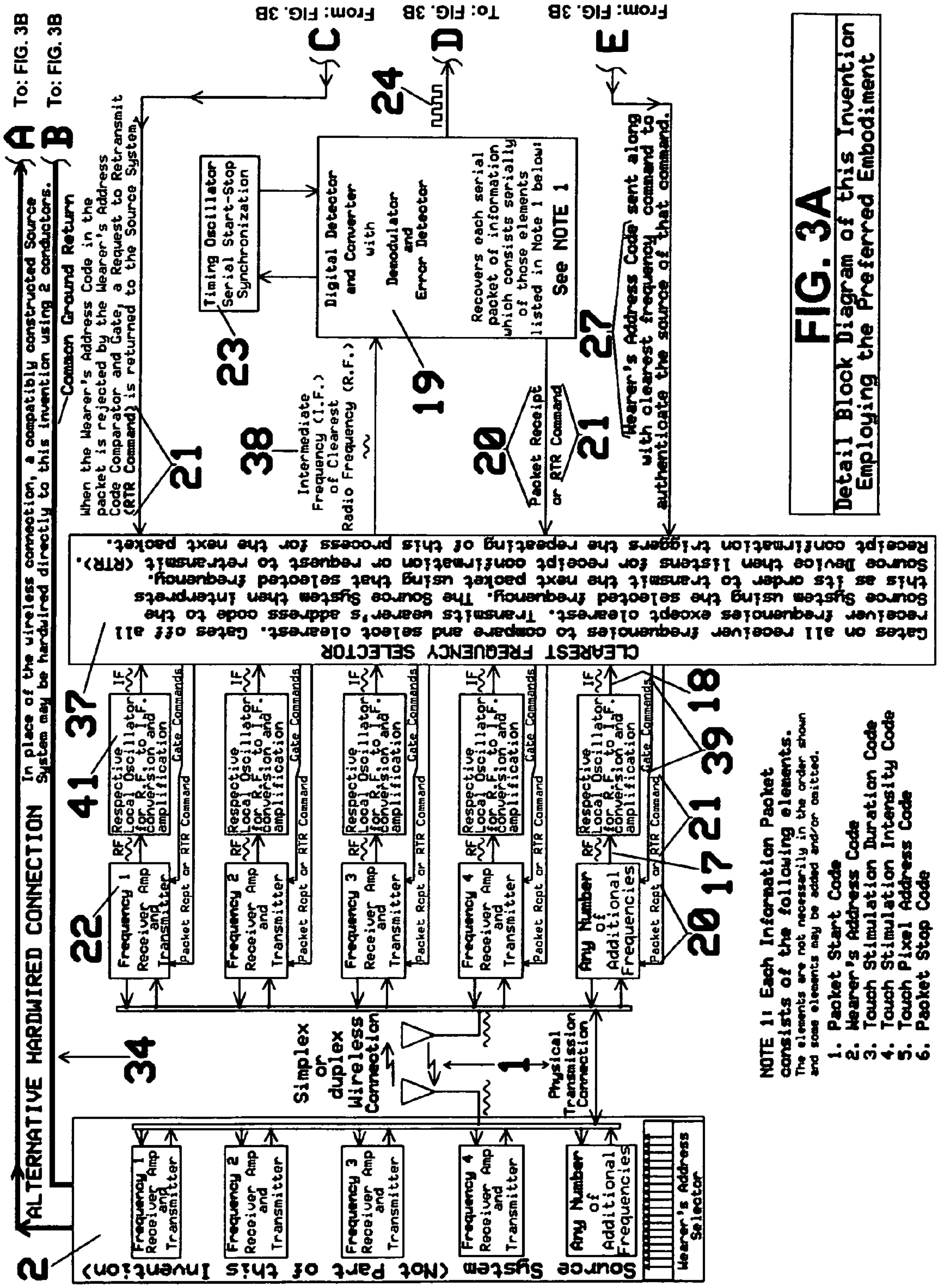

C. FIG. 3A is continued in FIG. 3B and together they are a detailed electrical block diagram of the invention employing the preferred embodiment.

Figure 3B:
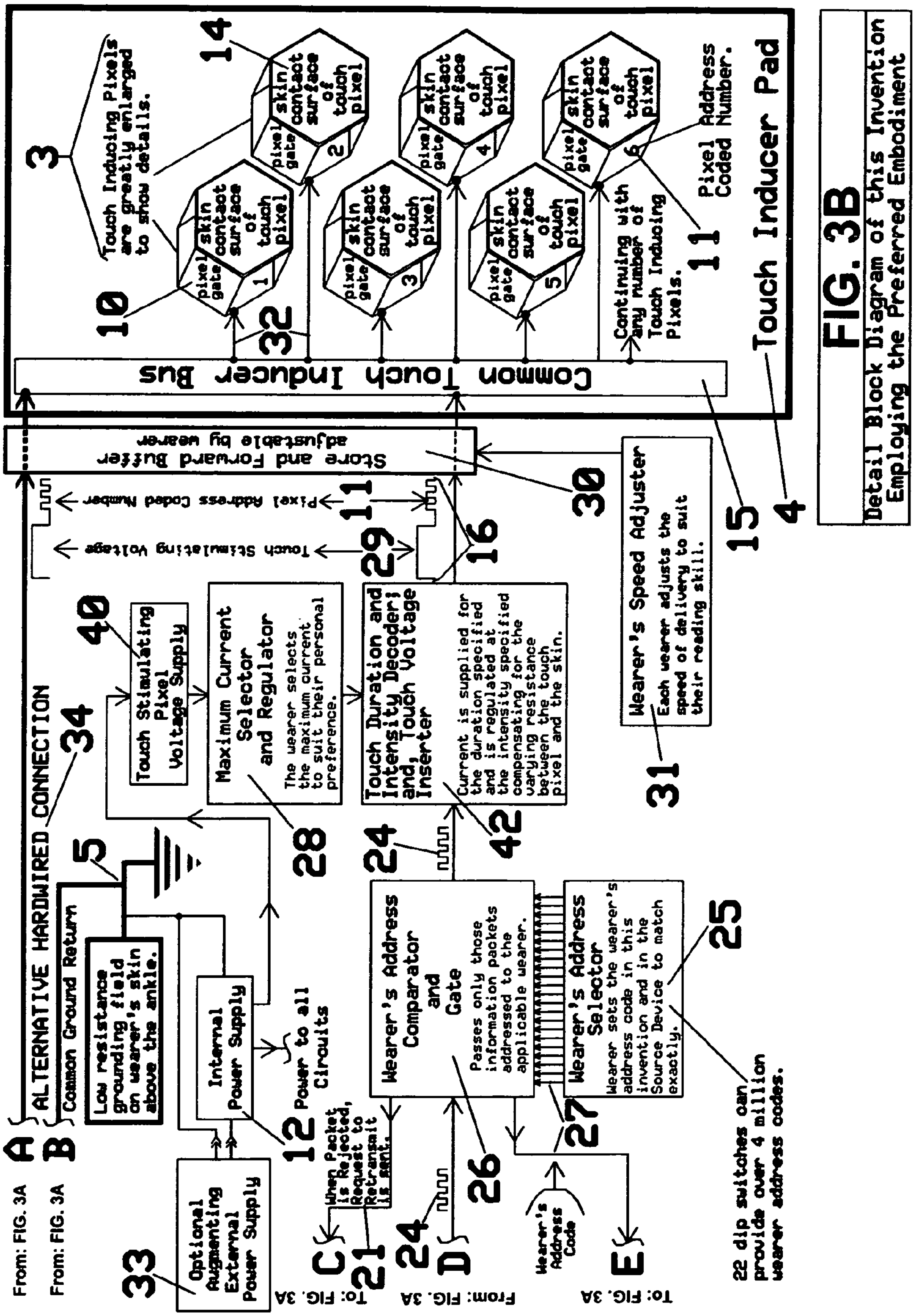

D. FIG. 3B is continued from FIG. 3A and together they are a detailed electrical block diagram of the invention employing the preferred embodiment.

Figure 4:
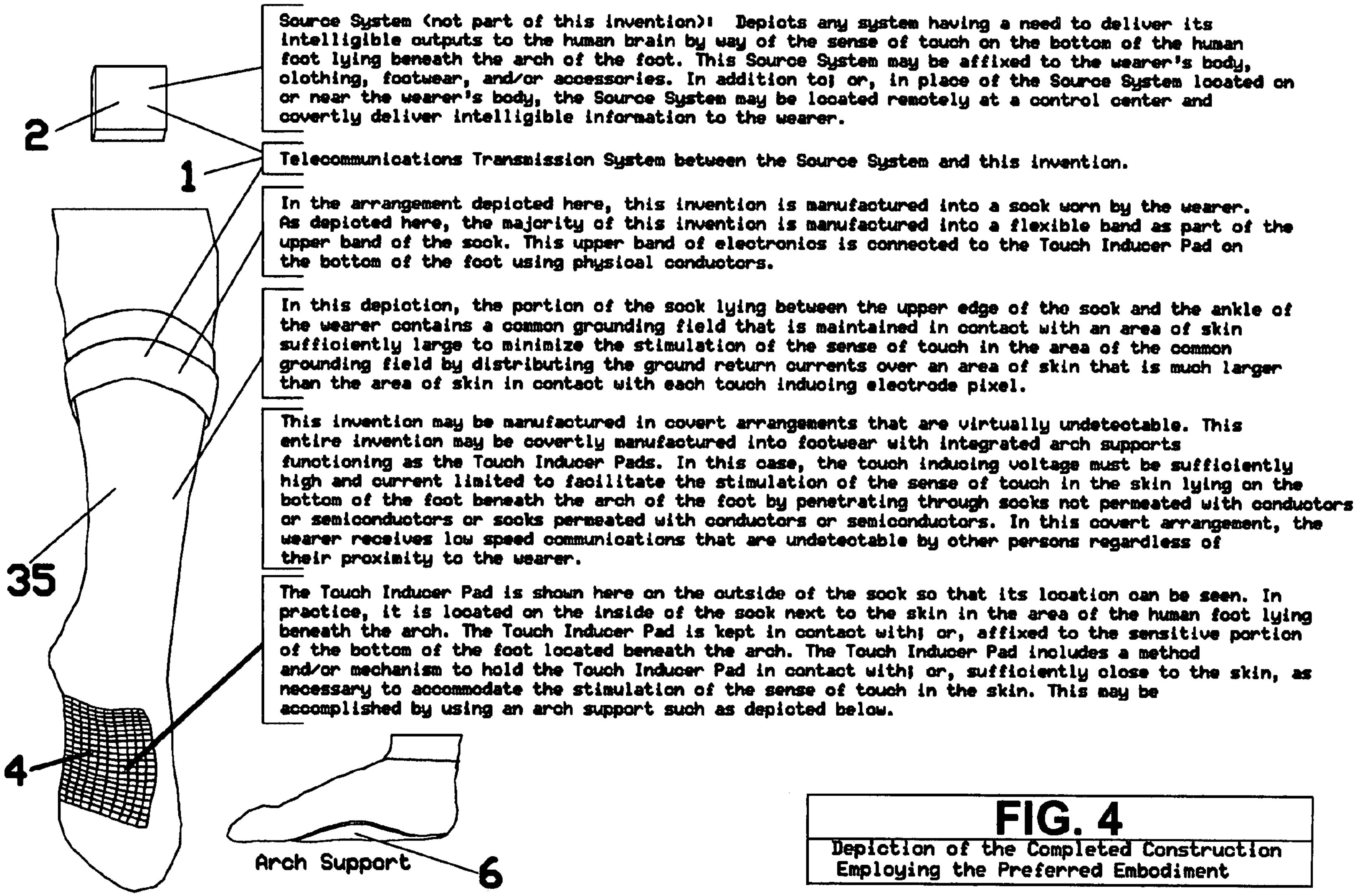

E. FIG. 4 is a depiction of the completed construction of the apparatus employing the preferred embodiment. The completed construction of the apparatus with the preferred embodiment is deliberately intended to be inconspicuous.

Figure 5:
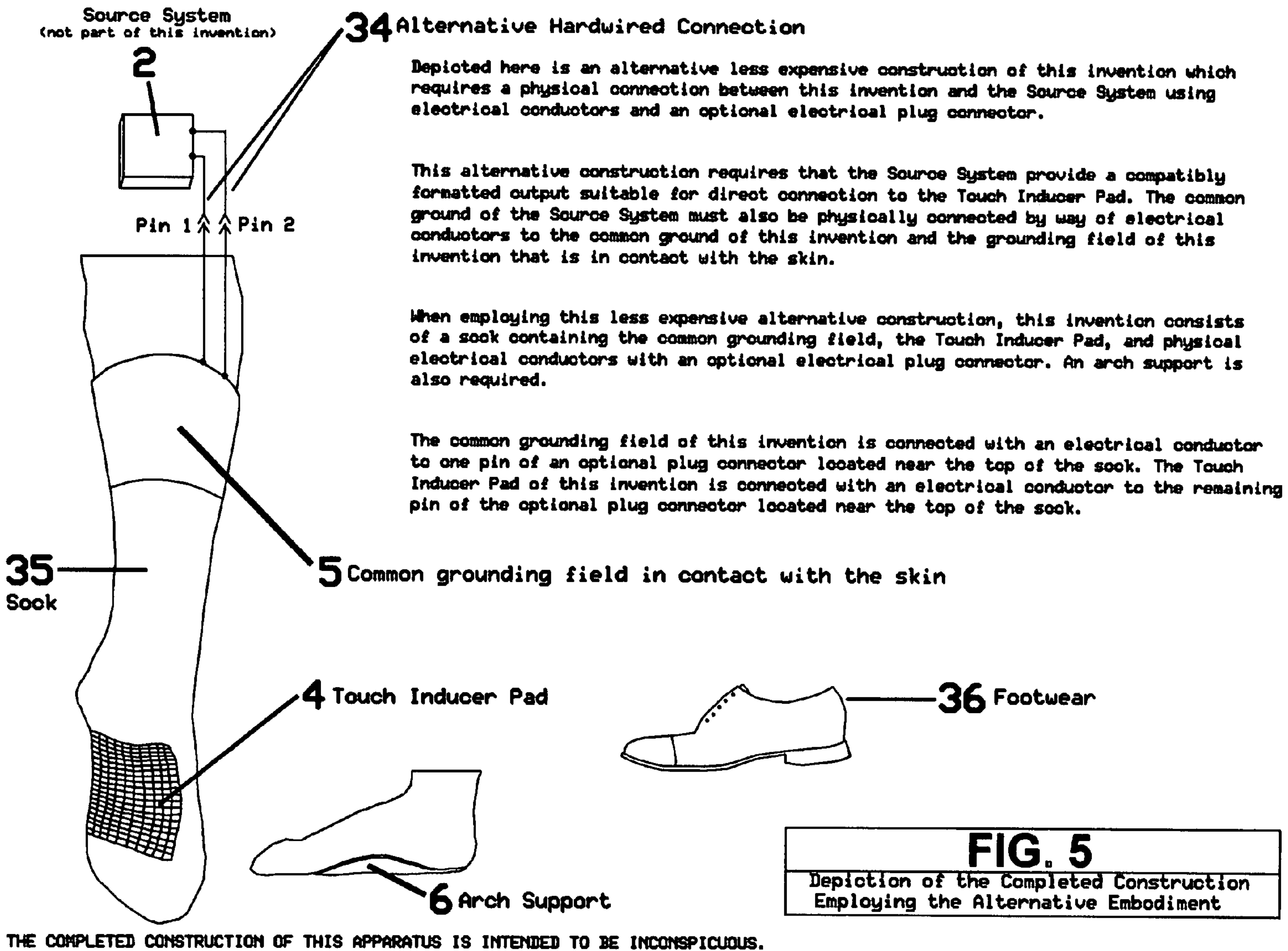

F. FIG. 5 is a depiction of the completed construction of the apparatus employing the alternative embodiment. Here also, the completed construction of the apparatus employing the alternative embodiment is deliberately intended to be inconspicuous.

2. FIG. 1, FIG. 2, FIG. 3A, FIG. 3B, FIG. 4 and FIG. 5 also contain some clarifying strategic descriptions and explanations to assist in understanding how to construct the invention.

FIG. 1, FIG. 2, FIG. 3A, FIG. 3B, FIG. 4 AND FIG. 5 REFERENCE NUMERALS

FIG. reference item and location numbers are identified in the following specifications and in the appended claims by being enclosed in brackets, such as [1]. The FIG. reference item and location numbers in the following specifications and in the appended claims relate to like numbers within FIG. 1, FIG. 2, FIG. 3A, FIG. 3B, FIG. 4 and FIG. 5.

SPECIFICATIONS FOR MAKING THE INVENTION BY EMPLOYING THE MINIMUM EMBODIMENT

1. The invention is an apparatus that prepares and delivers intelligible information to the human brain by intelligibly stimulating said skin. The invention is made up of the following minimum required elements:

A. a telecommunications transmission system [1] the intelligible outputs of the source system [2] to its intended touch inducing pixel [3] within a touch inducer pad [4], B. the touch inducer pad [4] containing any number of touch inducing pixels [3] arranged in any pattern, specifically including but not limited to a matrix or grid, C. a means of maintaining the touch inducer pad [4] directly or indirectly, via the intermediate material, in contact with an area of skin to accommodate the stimulation of that area of skin, D. a common ground return [5] that is common with the source system [2], the touch inducer pad [4] and the wearer's body; and, E. a means of permitting only a skin contact surface [14] of each of the touch inducing pixels [3] within the touch inducer pad [4] to directly or indirectly, via the intermediate material, contact a wearer's skin.

2. These minimum required elements are connected or related as follows:

A. a compatibly formatted intelligible output of the source system [2] is provided by the source system [2] for each touch inducing pixel [3] within the touch inducer pad [4] and is connected to its respective touch inducing pixel [3] within the touch inducer pad [4] by the telecommunications transmission system [1], B. said touch inducer pad [4] delivers its output to said skin by stimulating a wearer's sense of touch in the skin in an area of the skin contact surface [14] of each touch inducing pixel [3] within the touch inducer pad [4] specifically including but not limited to electrical current flow between the skin contact surface [14] of each touch inducing pixel [3] and the wearer's skin, electromechanical vibrations, and/or electrical voltage induced quartz crystal vibrations, C. the means of maintaining the touch inducer pad [4] directly or indirectly, via the intermediate material, in contact with said skin to accommodate the stimulation of the wearer's sense of touch in said skin, is accomplished by affixing said touch inducer pad [4] to said skin by any means, specifically including but not limited to adhesives, or by holding said touch inducer pad [4] directly or indirectly, via the intermediate material, in contact with said skin by using a physical or mechanical means, specifically including but not limited to, employing an arch support [6] that is separate from or integral to a footwear [36] and placed in the bottom of the inside of the footwear [36] at a location below an arch of the wearer's foot in a manner that results in holding the touch inducer pad [4] directly or indirectly, via the intermediate material, in contact with the skin on the bottom of the wearer's foot located below the arch of the foot of the wearer to facilitate the stimulation of that skin by the touch inducing pixels [3] in the touch inducer pad [4], D. all elements in the invention and the source system [2] along with the intelligible outputs of the source system [2] are electrically connected using the telecommunications transmission system [1] to its intended touch inducing pixel [3] within the touch inducer pad [4] and to the common ground return [5] which are both directly or indirectly, via the intermediate material, in contact with an area of skin on the wearer's body by way of using any means specifically including but not limited to wireless, an electrical conductor external to the wearer's body, or a plurality of electrical conductors external to the wearer's body; and, E. a means of permitting only the skin contact surface [14] of each of the touch inducing pixels [3] within the touch inducer pad [4] to directly or indirectly, via the intermediate material, come in contact with the wearer's skin.

3. Even though the preceding minimum required elements of the invention describes the source system [2] being connected by the telecommunications transmission system [1] which specifically includes the use of an electrical conductor dedicated to each respective touch inducing pixel [3] in said touch inducer pad [4], it is preferred to connect the source system [2] to the invention by employing multiplexing and/or modulating transmission techniques whether the connection between the source system [2] and the invention is by way of physical or wireless means.

SPECIFICATIONS FOR MAKING THE INVENTION BY EMPLOYING THE PREFERRED EMBODIMENT

1. The invention is an apparatus that prepares and delivers intelligible information to the human brain by intelligibly stimulating the wearer's sense of touch in said skin. When employing multiplexing and/or modulating transmission techniques as the telecommunications transmission system [1] between the invention and the source system [2], the invention is made up of the following minimum required elements:
   A. a receiver processor and amplifier [7],
   B. a detector, demultiplexer and/or demodulator [8],
   C. a touch duration and intensity decoder; and, touch stimulation voltage inserter with maximum current selector and speed selector buffer [9],
   D. the touch inducer pad [4],
   E. a means of permitting only the skin contact surface [14] of each of the touch inducing pixels [3] within the touch inducer pad [4] to directly or indirectly, via the intermediate material, come in contact with the wearer's skin,
   F. a means of providing a pixel gate [10] with operating power to facilitate its recognition of its unique pixel address coded number [11],
   G. the common ground return [5] directly or indirectly, via the intermediate material, in contact with the skin of the wearer at any location on the wearer's body; and,
   H. an internal power supply [12].
2. These elements are connected as follows:
   A. the receiver processor and amplifier [7] receives its input from the output of the source system [2] by way of simplex or duplex wireless or physical transmission providing the telecommunications transmission system [1],
   B. the receiver processor and amplifier [7] delivers its processed and amplified output to the input of the detector, demultiplexer and/or demodulator [8] by way of wireless or physical transmission,
   C. the detector, demultiplexer and/or demodulator [8] delivers its output to a wearer's address selector, comparator and gate [13] by way of wireless or physical transmission,
   D. the wearer's address selector, comparator and gate [13] delivers its output to a touch duration and intensity decoder; and, touch stimulation voltage inserter with maximum current selector and speed selector buffer [9] by way of wireless or physical transmission,
   E. the touch duration and intensity decoder; and, touch stimulation voltage inserter with maximum current selector and speed selector buffer [9] delivers its output to the touch inducer pad [4] by way of wireless or physical transmission,
   F. the touch inducer pad [4] delivers its output to said skin by stimulating the wearer's sense of touch in the skin in the area of the skin contact surface [14] of each touch inducing pixel [3] within the touch inducer pad [4] specifically including but not limited to electrical current flow between the skin contact surface [14] of each touch inducing pixel [3] and the wearer's skin, electromechanical vibrations, and/or electrical voltage induced quartz crystal vibrations,
   G. the means of permitting only the skin contact surface [14] of each of the touch inducing pixels [3] within the touch inducer pad [4] to directly or indirectly, via the intermediate material, come in contact with the wearer's skin,
   H. the means of providing the pixel gate [10] with operating power to facilitate its recognition of its unique pixel address coded number [11] is by way of a single conductor or a plurality of conductors connecting pixel gate [10] operating power to a power input of each pixel gate [10] either individually or in common by each pixel gate [10], whose input is mounted on a common conductive sheet functioning as a common touch inducer bus [15], deriving its operating power from that common conductive sheet, by way of extracting, processing, and filtering a pixel gate packet [16] or by way of supplying to the common conductive sheet a direct current voltage for use as an operating power for each pixel gate [10],
   I. all elements in the invention are electrically connected to the common ground return [5] that is directly or indirectly, via the intermediate material, in contact with the skin of the wearer of the invention at any location on the wearer's body; and,
   J. all elements in the invention are electrically connected to the internal power supply [12].
3. Further, the invention can also have one or more of the following:
   A. a function to convert a received radio frequency (R.F.) [17] to an intermediate frequency (I.F.) [18] to improve amplification, a respective local oscillator for R.F. to I.F. conversion and amplification [41],
   B. a digital detector and converter with demodulator and error detector [19] to reduce errors in transmission by employing packet receipt commands [20] and/or request to retransmit (RTR) commands [21] that are transmitted back to the source system [2], which works with other functions to prevent accidental and/or intentional interference and/or jamming,
   C. a receiver amplifier and transmitter [22] to facilitate the transmission of a packet receipt command [20] and/or request to retransmit (RTR) command [21] back to the source system [2],
   D. the receiver amplifier and transmitter [22] to facilitate the transmission of intelligible communications from the wearer to the source system [2],
   E. a timing oscillator [23] to improve the accuracy of the recovered intelligible information contained in a received information packet [24],
   F. the digital detector and converter with demodulator and error detector [19] that generates the packet receipt command [20] or request to retransmit (RTR) command [21] that is returned to the receiver amplifier and transmitter [22] for transmission back to the source system [2],
   G. a wearer's address selector [25], wearer's address comparator and gate [26] to avoid accidental and/or intentional interference, jamming and/or deception by ensuring that only the intelligible information addressed to the specific wearer is gated through, H. the wearer's address selector [25] that is changeable by the wearer, I. a function to transmit a wearer's address code [27] back to the receiver amplifier and transmitter [22] for inclusion with the transmission of the packet receipt command [20] and/or a request to retransmit (RTR) command [21] back to the source system [2] in order to reduce errors by confirming with the source system [2] that the packet receipt command [20] and/or the request to retransmit (RTR) command [21] are in fact generated by the intended recipient wearer, J. a maximum current selector and regulator [28] which is regulated to compensate for variations in the resistance between the skin contact surface [14] of each touch inducing pixel [3] in the touch inducer pad [4] and said skin that is in the area of the skin contact surface [14] of each touch inducing pixel [3] in the touch inducer pad [4], K. the maximum current selector and regulator [28] which is regulated to facilitate the wearer's selection of a maximum current that suits the wearer's personal preference, L. the maximum current selector and regulator [28] which is regulated and capable of providing a touch stimulating voltage [29] greater than and/or less than the voltage of the common internal power supply [12] of the invention, M. the store and forward buffer [30] with a wearer's speed adjuster [31] incorporated into the invention located electrically between a touch duration and intensity decoder; and, touch voltage inserter [42] and the touch inducer pad [4] in a manner that makes it possible for the wearer to adjust the speed of delivering information to the wearer's sense of touch that suits the wearer's reading skill, N. the common touch inducer bus [15] that is connected by a means of connecting [32] to the input of each pixel gate [10] of each associated individual touch inducing pixel [3], O. the common touch inducer bus [15] in the form of a conductive sheet upon which the input of each individual pixel gate [10] of each touch inducing pixel [3] is mounted, P. the pixel gate [10] that is physically and electrically located separate from each touch inducing pixel [3] in the touch inducer pad [4], Q. a microchip pixel gate [10] that is physically and electrically located as an integral part of each touch inducing pixel [3] in the touch inducer pad [4], R. the footwear [36] manufactured with an integral arch support [6] that lies in the area of said skin in a manner that holds the touch inducer pad [4] directly or indirectly, via the intermediate material, in contact with said skin, to accommodate the stimulation of the wearer's sense of touch in said skin in order to improve the clarity, quality and reliability of the intelligible image being delivered to said skin, S. the arch support [6] that is not integral to the footwear [36]; but, rather is inserted by the wearer into the inside bottom of the footwear [36] that lies in the area of said skin in a manner that holds the touch inducer pad [4] directly or indirectly, via the intermediate material, in contact with said skin, to accommodate the stimulation of said skin in order to improve the clarity, quality and reliability of the intelligible image being delivered to said skin, T. a means of affixing the touch inducer pad [4] to said skin, specifically including but not limited to using adhesives or any affixing means that results in the touch inducer pad [4] being affixed to said skin in a manner that holds the touch inducer pad [4] directly or indirectly, via the intermediate material, in contact with said skin, to accommodate the stimulation of said skin, that is used in place of or is used in addition to physical and/or mechanical means, specifically including but not limited to the arch support [6] integrated into the footwear [36] or the arch support [6] not integrated into the footwear [36], U. the internal power supply [12] that is contained within the physical enclosure that contains the invention or a portion of the invention, V. an external power supply [33] that is contained external to the physical enclosure that contains the invention or a portion of the invention that is used to augment the internal power supply [12] that is contained within the physical enclosure that contains the primary functions of the invention or a portion of the invention, W. the external power supply [33] that is contained external to the physical enclosure that contains the invention or a portion of the invention that is used to recharge the internal power supply [12] that is contained within the physical enclosure that contains the invention or a portion of the invention, X. electrical conductors providing an alternative hardwired connection [34] between the source system [2] and the store and forward buffer [30] or the touch inducer pad [4] of the invention, whether or not by way of an electrical plug connector, that functions to provide a direct electrical connection to the source system [2] that has been constructed to provide a compatible output that is suitable for direct electrical connection to the store and forward buffer [30] or the touch inducer pad [4] of the invention, Y. a sock [35] in which some or all of the functions of the invention are physically contained, Z. the footwear [36] in which some or all of the functions of the invention are physically contained, the arch support [6] in which some or all of the functions of the invention are physically contained; and, AA. the footwear [36] with the integral arch support [6] in which some or all of the functions of the invention are physically contained.

4. It should further be noted that:

A. the invention is sometimes referred to by various coined names, specifically including but not limited to "Teletoucher" and "Pedtoucher", but "Teletoucher" is preferable;

B. elements that make up the invention are constructed within a single container or multiple containers;

C. the telecommunications transmission system [1] employs modulating and multiplexing techniques specifically including but not limited to an electrical transmission wave carrying the intelligible signal by any analog modulation and/or multiplexing means and an electrical transmission wave carrying the intelligible signal by any digital modulation and/or multiplexing means, but digital modulation and/or multiplexing means are preferable;

D. the telecommunications transmission system [1} between the source system [2] and the invention is either simplex or duplex;

E. when the telecommunications transmission system [1] is by way of physical transmission connections, those physical transmission connections employed by the invention specifically include but are not limited to light-wave conductors, electrically conductive wires, and electrically conductive fibers or threads;

F. both the wireless transmission and the physical transmission employed by the invention employ various multiplexing means, specifically including but not limited to frequency, space, and time division multiplexing, but time division multiplexing is preferable;

G. both the wireless transmission and the physical transmission employed by the invention specifically includes but is not limited to simplex and duplex;

H. the elements of the invention are physically located at various places, specifically including but not limited to a wearer's body, a wearer's clothing, a wearer's accessories, a wearer's footwear [36], a wearer's arch supports [6], a wearer's socks [35] and any combination of these places, but the wearer's socks [35], the wearer's footwear [36] and/or the wearer's arch supports [6] are preferable, however, when the invention is constructed for uses intended to support covert operations, it is preferable to construct the entire invention including the common ground return [5] inconspicuously concealed within the footwear [36];

I. the element that performs the function of the touch inducer pad [4] are of any size and be located anywhere on the wearer's body, specifically including but not limited to the wearer's footwear [36], the wearer's arch support [6] that is constructed as an integral part of the wearer's footwear [36], the wearer's arch support [6] that is not constructed as integral part of the wearer's footwear [36]; the touch inducer pad [4] that is affixed to said skin, and/or the wearer's sock [35], but the wearer's sock [35] is preferable when the invention is constructed for uses which are not intended to support covert operations; however, when the invention is constructed for uses intended to support covert operations, the touch inducer pad [4] should be constructed as an integral inconspicuous part of the wearer's arch support [6] that is constructed as an integral part of the wearer's footwear [36];

J. the touch inducer pad [4] uses, singularly or in combination, various means of stimulating said skin at the specific location of each addressed touch inducing pixel [3], specifically including but not limited to heat, cold, mechanical movement, vibrations, electromechanical, electrical, and/or any means or combination of means that creates a perceptible sensation in said skin at the specific location of each addressed touch inducing pixel [3], but electrical signals delivered by way of touch inducing pixels [3] which are directly or indirectly, via the intermediate material, in contact with said skin is preferable;

K. the electrical signals delivered by way of the touch inducing pixels [3] specifically includes but is not limited to alternating current of any frequency and amplitude and direct current voltage of any polarity and amplitude;

L. the touch inducer pad [4] uses the touch inducing pixels [3] arranged in various patterns, specifically including but not limited to the shape of letters, numbers, lines of various orientations, images, grids, and matrix, but matrix is preferable;

M. the touch inducer matrix of touch inducing pixels [3] is constructed in various patterns, specifically including but not limited to square grid pattern, interleaving square grid pattern, and honeycomb pattern, but honeycomb pattern is preferable;

N. the touch inducer pad [4] employs the touch inducing pixels [3] of various sizes and shapes, specifically including but not limited to round, square, rectangular, and hexagonal, but hexagonal is preferable;

O. to facilitate visualization and interpretation of the intended intelligible information by the human brain, the intelligible information of images, shapes, symbols, motions and/or indicators is delivered to the brain by stimulating said skin by using various delivery techniques, specifically including but not limited to steady-state image stimulation, modulated image stimulation, and tracing, but tracing is preferable;

P. the touch inducer pad [4] is of any size and shape and is placed anywhere on the wearer's body specifically including but not limited to the wearer's skin and the wearer's tongue and the orientation of the traced intelligible information of letters, numbers, images, shapes, symbols, motions and/or indicators delivered to the wearer's brain by stimulating said skin or tongue surface is in any arrangement, specifically including but not limited to left/top to right/bottom and front/top to back/bottom as viewed by the wearer's mind's eye, left/top to right/bottom and back/bottom to front/top as viewed by the wearer's mind's eye, right/bottom to left/top and front/top to back/bottom as viewed by the wearer's mind's eye and right/bottom to left/top and back/bottom to front/top as viewed by the wearer's mind's eye, but left/top to right/bottom and front/top to back/bottom is preferable;

Q. the element of the invention that performs the function of delivering the intelligible touch stimulating outputs of the source system [2] to its intended touch inducing pixel [3] within the touch inducer pad [4] at the intended time for the intended duration and at the intended intensity specifically includes but is not limited to a system of synchronized horizontal and vertical sweep generators which provide a time sharing connection of the touch inducing signal to its intended touch inducing pixel [3] in the touch inducer pad [4] or a system of pixel gates [10] with each touch inducing pixel [3] in the touch inducer pad [4] having its own associated and dedicated pixel gate [10] that is programmed with a pixel address coded number [11] that is unique to each touch inducing pixel [3], but a system of pixel gates [10] with each touch inducing pixel [3] in the touch inducer pad [4] having its own associated and dedicated pixel gate [10] that is programmed with the pixel address coded number [11] that is unique to each touch inducing pixel [3] is preferable.

DESCRIPTION OF THE MINIMUM EMBODIMENT

1. The minimum embodiment of the invention consists of the touch inducer pad [4] manufactured into a bottom of the sock [35] in the area of the sock [35] that lies directly or indirectly, via the intermediate material, in contact with the skin on the bottom of the foot that lies beneath the arch of the foot. the touch inducer pad [4] used in this manner is laid out in any kind of grid and/or matrix arrangement with any number of cells. Within each cell, the touch inducing pixel [3] is constructed. Each touch inducing pixel [3] within each cell is an electrical conductor directly or indirectly, via the intermediate material, in contact with the skin that is separate from the conductor that connects it to the source system [2] and is electrically connected to the source system [2] by way of an electrical plug connector or each touch inducing pixel [3] within each cell is an extension of the same conductor that connects to the source system [2] without the use of an electrical plug connector. That conductor is repeatedly looped around the portion of the sock [35] lying within each cell until a skin contact area is created to function as the touch inducing pixel [3] directly or indirectly, via the intermediate material, in contact with the skin. This is repeated for every cell within the touch inducer pad [4], with the touch inducing pixel [3] within each of those cells, being connected to the source system [2] by way of at least one conductor dedicated to that touch inducing pixel [3]. The common ground return [5], that is connected to the source system [2], is constructed in a portion of the sock [35] preferably lying above the ankle and is maintained directly or indirectly, via the intermediate material, in constant contact with an area of skin that minimizes the stimulation of the wearer's sense of touch in that area of the skin. All the connections to the source system [2] is of any length necessary to accommodate the location of the source system [2]. All of the connections between the invention and the source system [2] are electrical conductors with or without an electrical plug connector between the invention and the source system [2].

2. Typically, this minimum embodiment is used with the source system [2] specifically including but not limited to an electronic compass designed to deliver its output indicating the direction of north by accessing each conductor dedicated to each touch inducing pixel [3] in a sequence that results in the sensation of a moving point that traces a line on said skin. The source system [2] is mounted on or affixed to any portion of the wearer's body, clothing, or accessories; however, it is important to note that the orientation of the source system [2] will determine the direction of the trace. Therefore, wherever the source system [2] is mounted or affixed, it must be oriented in such a way that when the portion of the wearer's body associated with the source system [2] is facing north, the trace on said skin will be from the heel of the foot through the center of the touch inducer pad [4] towards the toes of the foot. Likewise when the wearer turns that associated portion of his/her body to the west, the trace indicating the direction of north will be from the left/top side of the foot through the center of the touch inducer pad [4] to the right/bottom side of the foot, etc.

DESCRIPTION OF THE PREFERRED EMBODIMENT

1. The invention is intended to accommodate the use of the invention by a large number of wearer's in close proximity to each specifically including but not limited to armed forces in combat. Therefore, interference and/or intentional jamming of the invention is a primary concern. The location of the source system [2] specifically includes but is not limited to the wearer's body, a command and control center or both the wearer's body and a command and control center.

2. In the preferred embodiment, the telecommunications transmission system [1] between the source system [2] and the invention is by wireless electronic waves carrying the intelligence by way of pulse code modulation. The front end of the invention consists of a plurality of radio frequency receiver amplifier and transmitters [22] tuned to various frequencies or a radio frequency receiver amplifier and transmitter [22] having a plurality of tuned frequencies. A clearest frequency selector [37] gates on all the receive frequencies within each of the receiver amplifier and transmitters [22] then analyzes and compares all of the gated on receive frequencies in order to select the clearest frequency. It then gates off all of the receive frequencies within each of the receiver amplifier and transmitters [22] except for the receiver amplifier and transmitter [22] that is providing the clearest frequency. The wearer's address code [27] is then transmitted to the source system [2] using the selected clearest frequency. The source system [2] then compares that wearer's address code [27] with the wearer's address code [27] programmed within the source system's [2]. If the source system [2] finds a match, it then transmits the next received information packet [24] using the selected clearest frequency. Each received information packet [24] is designed to stimulate the wearer's sense of touch in the skin located in the area of the skin contact surface [14] of the one specific touch inducing pixel [3] addressed by the pixel address coded number [11] contained within that received information packet [24]. Each received information packet [24] contains some or all of the following, but is not limited to the following:

A. packet start code,
B. wearer's address code,
C. touch stimulation duration code,
D. touch stimulation intensity code,
E. touch pixel address code and
F. packet stop code.

3. When the next received information packet [24] is received, it is checked for errors by the digital detector and converter with demodulator and error detector [19]. If no errors are found, then the packet receipt command [20] is transmitted back to the source system [2] along with the wearer's address code [27] for confirmation by the source system [2], if confirmed, that portion of the process is repeated resulting in the receipt of the next received information packet [24], etc. If errors are detected in the received information packet [24], then the request to retransmit (RTR) command [21] is transmitted back to the source system [2] along with the wearer's address code [27] for confirmation by the source system [2], then the previous received information packet [24] which was received with errors is retransmitted. This process is repeated until the received information packet [24] is received error free and the packet receipt command [20] is transmitted back to the source system [2] along with the wearer's address code [27], for confirmation by the source system [2], which, if confirmed by the source system [2], cause the process to progress to the transmission of the next received information packet [24].

4. Once the received information packet [24] is received error free, the received information packet [24] is sent on to the wearer's address comparator and gate [26]. The wearer has previously set his/her own unique wearer's address code [27] using the wearer's address selector [25] which is designed to provide any number of discrete and unique wearer's address codes [27]. If the wearer's address code [27] in the received information packet [24] does not match the previously selected wearer's address code [27] set in the wearer's address selector [25], the received information packet [24] is rejected and the request to retransmit (RTR) command [21] is generated. If the wearer's address code [27] in the received information packet [24] does match the wearer's address code [27] previously set in the wearer's address selector [25], then portions of the received information packet [24] are transmitted to the touch duration and intensity decoder; and, touch voltage inserter [42]. Those portions consist of the following but are not limited to the following:

A. touch stimulation duration code,
B. touch stimulation intensity code and
C. touch pixel address code.

5. The touch duration and intensity decoder; and, touch voltage inserter [42] then decodes the touch stimulation intensity code contained within the received information packet [24] and inserts the touch stimulating voltage [29] at the specified amplitude. It then decodes the touch stimulation duration code contained within the received information packet [24] and responds by maintaining the touch stimulating voltage [29] at the specified voltage amplitude for the specified duration of time. The pixel address coded number [11] along with the touch stimulating voltage [29] of the specified amplitude and duration are then transmitted to the store and forward buffer [30]. The store and forward buffer [30] then stores each pixel gate packet [16] and releases each pixel gate packet [16] to the common touch inducer bus [15] which is connected to the input of each pixel gate [10] associated with each touch inducing pixel [3]. The store and forward buffer [30] releases each pixel gate packet [16] at a speed selected by the wearer to suit his/her own personal reading skill using the wearer's speed adjuster [31].
6. Each pixel gate [10] is manufactured as an integral part of a microchip touch inducing pixel [3], each of which is encoded with its individually unique pixel address coded number [11] such that each touch inducing pixel [3] is gated on only when the incoming pixel address coded number [11] matches the encoded pixel address coded number [11] of the respective touch inducing pixel [3]; wherein, once the microchip touch inducing pixel [3] is gated on, it remains gated on until the microchip touch inducing pixel [3] detects the end of the touch stimulating voltage [29], at which time, the microchip touch inducing pixel [3] gates off and remains gated off until it is again addressed.
7. The means of providing the pixel gate [10] with operating power to facilitate its recognition of its unique pixel address coded number [11] specifically includes but is not limited to the single conductor or the plurality of conductors connecting pixel gate [10] operating power to the power input of each pixel gate [10] either individually or in common but preferably by each pixel gate [10] whose input is mounted on the common conductive sheet functioning as the common touch inducer bus [15] deriving its operating power from that common conductive sheet by way of extracting, processing, and filtering a total of the pixel gate packet [16] or by way of supplying a direct current voltage to the common conductive sheet for use as the operating power for each pixel gate [10].

USES OF THE INVENTION

1. The human brain cannot simultaneously concentrate on more than one task using a single sense. In an attempt to do so, the brain must divide its time, concentration and focus between or among those multiple tasks that require the use of the same sense. However, the human brain can simultaneously interpret inputs from the 5 senses independently without one sense interfering with the remaining senses.
2. The invention uniquely contributes to the field of telecommunications by using the wearer's sense of touch in said skin to communicate intelligible information and communications without interfering with or diverting any of the other senses or bodily capabilities. More specifically, an outdoorsman, hunter, or combat soldier can be kept constantly aware of the direction of north while keeping their eyes, ears, nose, mouth, and hands focused and dedicated to other tasks. In the case of a combat soldier, this capability could make the difference between life and death. Additionally, in the case of combat soldiers, a second source system [2] consisting of a landmine detector in the footwear [36] on both feet will trigger a significant electric shock on said skin of the foot that is about to step on a landmine preventing a large number of injuries and their associated expenses in terms of both dollars and lost mission capabilities. Also, the source system [2] remotely located at a command and control location can transmit very low speed communications to each soldier by way of tracing each number and/or letter on the bottom of the soldiers foot with a protocol, specifically including but not limited to a trace left/top to right/bottom across the area closest to heel of the foot indicating the end of a word and a double trace indicating the end of a sentence. Additional multiple traces could be used to indicate the end of a paragraph or the end of the transmission. Again, these communications can be received by the soldier without having to divert any of his/her senses or hands.
3. The source systems [2] equipped with cameras mounted in the glasses or on the head of a blind person can be software manipulated to reduce the picture to its essential outlines and those outlines then traced on the bottom of the blind person's foot or feet in a manner that would give the blind person some sense of rudimentary sight such that a blind person would be able to feel the traced outline of a glass setting on a table in front of him/her and be able to feel the traced moving outline of their hand and arm as they reach out for the glass until they can feel that the trace of their hand is approaching the trace of the glass.
4. The invention is an apparatus that interfaces the compatibly formatted output of the source system [2] with said skin in order to deliver intelligible information to the brain of the wearer. As such, the uses of the invention are limited only by the imagination and ingenuity of those who invent the source systems [2]. In that sense, the invention is also unique in that it stimulates and makes possible the inventing, patenting, and manufacturing of the source systems [2] designed to perform any function that can be interpreted by the wearers sense of touch.

HOW TO OPERATE AND USE THE INVENTION

The prospective wearer first sets the wearer's address selector [25] in the invention and in the source system [2] to match each other exactly. The first time prospective wearer then sets the touch stimulation voltage [29] to minimum using the maximum current selector and regulator [28] and the wearer's speed adjuster [31] to the slowest setting. The sock [35], being one of the possible embodiments, is then placed on the wearer's foot (the right foot is preferable for a right handed person). If the footwear [36] does not contain the integral arch support [6], the wearer places the arch support [6] in the inside bottom of a shoe in the area of said skin that lies beneath the arch of the foot. The wearer then turns on the source system [2] and turns on the invention and places his/her foot, on which the invention is worn, into the footwear [36]. Footwear [36] that can be snuggly laced is preferable. The wearer then practices interpreting the information being traced on the bottom of his/her foot and then readjusts the maximum current selector and regulator [28] and the wearer's speed adjuster [31] to suit his/her personal preference.

HOW TO MAKE THE INVENTION FOR USE IN COVERT OPERATIONS AND HOW TO USE THE INVENTION IN COVERT OPERATIONS

1. When manufacturing the invention for use in covert operations, it should be manufactured entirely within the footwear [36] hereinafter referred to as a "shoe". In this application, the source system [2] will always be remotely located and not be located on the covert operative's person. All the electronics of the invention should be manufactured within the sole, heel or other concealed location within the shoe. The shoe should be manufactured with the integral arch support [6] in which the touch inducer pad [4] is inconspicuously manufactured in a way such that a person upon examining the shoe would not see, feel or otherwise detect the touch inducer pad [4]. The shoe should be manufactured as a laced shoe which can be tied to a snug fit such that there is minimum space between the touch inducer pad [4] and said skin. The common ground return [5] should be manufactured inconspicuously into the tongue or other portion of the shoe in a manner that holds the common ground return [5] directly or indirectly, via the intermediate material, in constant contact with the skin of the wearer at a location as far as possible from the location of the touch inducer pad [4], such as on the top of the foot. By employing high voltages and low currents by way of the touch stimulating voltage [29], the wearer will be able to wear socks that are not permeated with conductors or semiconductors or socks that are permeated with conductors or semiconductors which will better facilitate the delivery of the touch stimulating voltages [29] through the sock [35] to the skin. The invention should automatically turn off when removed from the foot and this turn off should be by way of total disconnect of all the internal power supply [12] to all components so that it cannot be detected by devices designed to detect secret devices by detecting their residual radiation. The invention should not automatically turn on when the shoe is again placed on the foot. The invention should only be turned on by a specific intentional movement of the foot that cannot be accidentally duplicated by normal standing and walking. For example, a strong upward movement of the big toe can engage a switch that activates a relay that reconnects power to the invention which, upon startup, sends a confirmation shock to the wearer to confirm that he/she has in fact successfully turned the invention on. While the shoe is being worn the wearer should have the capability of intentionally turning the invention off such as by way of sensing a downward motion of the big toe in the form of a specific Morse code combination of letters and/or numbers that is not likely to be unintentionally duplicated or by another strong upward movement of the big toe reactivating the same switch that turned the invention on and using internal logic that would cause this second activation of the same switch to result in the invention turning off. As part of the shut down protocol, the invention sends a distinctly different confirmation shock to the wearer to confirm that he/she has in fact successfully turned the invention off. While the primary use of the invention in this covert environment is to send very low speed information to the covert operative from a command and control center, this Morse code capability with an upward or downward movement of the big toe or by any other means does permit the wearer to inconspicuously communicate with the source system [2] at a very low speed. Since both the received and transmitted information in this environment is very low speed, it is possible to use very low frequencies which are less likely to be detected since the modern trend is towards very high speeds and very high frequencies. Additionally, very low frequencies are capable of traveling farther than high frequencies.
2. The invention and its technologies when constructed in a secret manner that is virtually undetectable, as for use in covert operations, should be kept from the possession of or use by, those who would use the invention to do harm to the United States of America or to conspire with accomplices to cheat at poker or other games at gambling facilities.

SUMMARY

1. Although the invention has been described in the preceding specifications with a certain degree of particularity, it is to be recognized and understood that the invention is not limited to the specific and precise form detailed in the preceding specifications and that various modifications, additions, deletions, and alterations are possible by persons skilled in the art without departing from the spirit and scope of the invention as defined in the appended claims.
2. It being impractical to include within the appended claims the descriptions and uses of all possible elements and means that further comprise and enhance the invention, the extensive details contained in the preceding specification and their equivalent must be considered to augment and enhance the appended claims; however, their use to augment and enhance the appended claims does not vitiate the spirit and scope of the invention.
3. The invention is limited only by the appended claims and their equivalents.

What is claimed is:

1. An apparatus, which is referred to in this claim by the descriptive name of a "touch inducer pad" [4], hereinafter in this claim referred to as "the touch inducer pad [4]", whose input, which is by way of a common touch inducer bus [15] within the touch inducer pad [4], is connected to an output of an electronic interface system, which is constructed internal or external to the touch inducer pad [4], with the output of the electronic interface system being specifically designed to provide a pixel gate packet [16] having an output protocol that is compatible with an input protocol requirement of the common touch inducer bus [15] input to the touch inducer pad [4], which interfaces the pixel gate packet [16] with a wearer's sense of touch in an area of a wearer's skin or tongue that is directly or indirectly, via an intermediate material, in contact with a skin contact surface [14] of a touch inducing pixel [3] within the touch inducer pad [4] by way of a pixel gate [10] that is the touch inducing pixel [3] input that is programmed with a pixel address coded number [11] unique to the pixel gate [10], which facilitates a connection of each of the pixel gate [10] inputs within the touch inducer pad [4] to the common touch inducer bus [15] to which the pixel gate packet [16] output of the electronic interface system having the output protocol that is compatible with the input protocol requirements of the touch inducer pad [4] is also electrically connected in common with the pixel gate [10] inputs whereby the pixel address coded number [11] unique to each of the pixel gate [10] inputs facilitates the addressing and activation of the touch inducing pixel [3] addressed by the pixel address coded number [11] individually, in any order, in any sequence, in any arrangement and at any intensity for any duration of time as dictated by the output of the electronic interface system by way of a touch stimulating voltage [29] contained within the pixel gate packet [16] to stimulate the wearer's sense of touch in an area of the wearer's skin or tongue that is directly or indirectly, via the intermediate material, in contact with the skin contact surface [14] of the touch inducing pixel [3] within the touch inducer pad [4] in intelligible patterns that can be interpreted by a human brain; the touch inducer pad [4] comprises:

the common touch inducer bus [15], the pixel gate [10], the touch inducing pixels [3] of any quantity, constructed in shapes specifically including but not limited to the shape of a circle or the shape of any geometric figure having any number of sides, a means of connecting [32] the common touch inducer bus [15] to the pixel gate [10] input of each of the touch inducing pixels [3] within the touch inducing pad [4], the pixel address coded number [11], a means of permitting only the skin contact surface [14] of each of the touch inducing pixels [3] within the touch inducer pad [4] to directly or indirectly, via the intermediate material, come in contact with the area of the wearer's skin or tongue, a means of providing the pixel gate [10] with operating power to facilitate its recognition of the pixel address coded number [11], a means of maintaining the touch inducer pad [4] directly or indirectly, via the intermediate material, in contact with the area of the wearer's skin or tongue to accommodate a stimulation of the wearer's sense of touch in the area of the wearer's skin or tongue by the skin contact surface [14] of each of the touch inducing pixels [3] within the touch inducer pad [4], a common ground return [5] that is in common with the touch inducer pad [4], the electronic interface system, a source system and the area of the wearer's skin or tongue; and, a means of stimulating a sense of touch in the area of the wearer's skin or tongue that is maintained directly or indirectly, via the intermediate material, in contact with the skin contact surface [14] of each of the touch inducing pixels [3] within the touch inducer pad [4];

wherein, these component parts of the touch inducer pad [4] are constructed with electrical characteristics, physical characteristics, connections or relationships as follows:

the common touch inducer bus [15] is a common electrically conductive bus that is manufactured as an integral part of the touch inducer pad [4] whose input is a compatibly prepared and formatted intelligible information output generated by the electronic interface system and whose output is electrically connected in common with the pixel gate [10] input of each of the touch inducing pixels [3] in the touch inducer pad [4];

each of the touch inducing pixels [3] in the touch inducer pad [4] receives its input from the common touch inducer bus [15] and when activated by the receipt of the pixel address coded number [11], delivers its output of the touch stimulating voltage [29] to the wearer's sense of touch in the area of the wearer's skin or tongue that is directly or indirectly, via the intermediate material, in contact with the skin contact surface [14] of the touch inducing pixel [3]; wherein, a construction of each of the touch inducing pixels [3] specifically includes but is not limited to the pixel gate [10], the touch inducing pixel [3], and the skin contact surface [14] being manufactured as a single physical unit in the form of a single microchip, in which, one end of the touch inducing pixel [3] is the input to the pixel gate [10] which is electrically connected to the common touch inducer bus [15] and the opposite end of the touch inducing pixel [3] is the skin contact surface [14] of the touch inducing pixel [3];

the touch inducer pad [4] is constructed in sizes specifically including but not limited to a size less than one square inch and a size greater than one square inch up to and including a size equal to that of the wearer's entire skin surface forming a partial or full body suit containing any number of cells arranged in patterns within the touch inducer pad [4] specifically including but not limited to a grid, a matrix, or a honeycomb pattern and which, within each cell, the touch inducing pixel [3] is constructed in shapes specifically including but not limited to the shape of a circle or the shape of any geometric figure having any number of sides;

the means of connecting [32] the common touch inducer bus [15] to each of the pixel gates [10] input specifically includes but is not limited to an input surface of each of the pixel gates [10] being electrically and physically mounted on a common electrically conductive material which serves to function as the common touch inducer bus [15];

a connection of the common touch inducer bus [15] to the electronic interface system specifically includes but is not limited to electrical conductor/conductors or transmission system/systems whose signal carrying capabilities satisfies the transmission needs of the compatibly prepared and formatted intelligible information output of the electronic interface system;

the means of permitting only the skin contact surface [14] of each of the touch inducing pixels [3] within the touch inducer pad [4] to directly or indirectly, via the intermediate material, contact the wearers skin or the wearers tongue;

the means of providing the pixel gate [10] with operating power to facilitate each of the pixel gates [10] recognition of the pixel address coded number [11] specifically includes but is not limited to each of the pixel gates [10] input being mounted on the common electrically conductive material which serves to function as the common touch inducer bus [15] deriving a direct current voltage operating power from the common touch inducer bus [15] by rectifying and filtering the pixel gate packets [16] on the common touch inducer bus [15] or by way of supplying to the common touch inducer bus [15] the direct current voltage operating power for each of the pixel gates [10];

the means of maintaining the touch inducer pad [4] directly or indirectly, via the intermediate material, in contact with the area of the wearers skin or tongue to accommodate the stimulation of the wearers sense of touch in the area of the wearers skin or tongue is accomplished by affixing the touch inducer pad [4] to the area of the wearers skin or tongue by any means, specifically including but not limited to adhesives or by mechanically or physically holding the touch inducer pad [4] directly or indirectly, via the intermediate material, in contact with the area of the wearer's skin or tongue, and when the area of the wearer's skin to be stimulated by the touch inducer pad [4] is an area of a wearer's foot that is located below an arch of the wearer's foot, the touch inducer pad [4] may be constructed within a sock [35], an arch support [6] or a footwear [36] and be held directly or indirectly, via the intermediate material, in contact with the area of the wearer's skin that is located below the arch of the wearer's foot, by using a physical or mechanical means specifically including but not limited to, employing the sock [35], the arch support [6] that is integral to the footwear [36] or separate from the footwear [36] and placed in a bottom of the inside of the footwear [36] at a location below the arch of the wearer's foot in a manner that results in holding the touch inducer pad [4] directly or indirectly, via the intermediate material, in contact with the area of the wearer's skin to facilitate the stimulation of the wearer's sense of touch in the area of the wearer's skin in an area of the skin contact surface [14] of each of the touch inducing pixels [3] within the touch inducer pad [4];

the common ground return [5] is maintained directly or indirectly, via the intermediate material, in constant contact with the skin of the wearer of the touch inducer pad [4] by affixing the common ground return [5] to the skin of the wearer by any means, specifically including but not limited to adhesives or by mechanically or physically holding the common ground return [5] directly or indirectly, via the intermediate material, in contact with the skin of the wearer and is electrically connected in common with the electronic interface system, the source system [2] and the touch inducer pad [4] specifically including but not limited to electrical conductors;

the wearer's sense of touch in the area of the wearer's skin or tongue in the area of the skin contact surface [14] of each of the touch inducing pixels [3] within the touch inducer pad [4] is specifically stimulated by but not limited to electrical current flow between the skin contact surface [14] of each of the touch inducing pixels [3] and the wearer's skin or tongue, electromechanical vibrations, lasers, heat, cold and/or electrical voltage induced quartz crystal vibrations; and, the touch inducing pad [4] apparatus is constructed in a size and shape specifically including but not limited to snug fitting clothing that is constructed to physically hold the skin contact surface [14] of each of the touch inducing pixels [3] within the touch inducing pad [4] directly or indirectly, via the intermediate material, in contact with the wearer's skin and is constructed with an electrical interface connection to facilitate an electrical connection of that snug fitting clothing with video games in order to provide video game players who are wearing the touch inducing pad [4] apparatus with a sense of touch corresponding with the action in the video game such that the video game players can feel the sensation of being shot, stabbed or otherwise injured corresponding with the experiences of the players character in the video game.

2. An electronic interface system, which is constructed in whole or in part within a source system [2], within a touch inducer pad [4], within one or more other containers or with distributed construction among some or all of these and includes the electrical components and circuits necessary to receive, convert, transmit controls and process the source system [2] information output to create a pixel gate packet [16] having a protocol required by the touch inducer pad [4] input whereby all references to the electronic interface system hereinafter in this claim include all of the preceding description of the electronic interface system all of which are connected to the source system [2] and/or with each portion of the construction by way of a telecommunications transmission system [1] or by way of an alternative hardwired connection [34] all of which work together to interface the source system [2] and the touch inducer pad [4] to deliver an intelligible information to a human brain by stimulating a wearer's sense of touch in intelligible patterns within an area of skin or tongue that is directly or indirectly, via the intermediate material, in contact with a skin contact surface [14] of a touch inducing pixel [3] within the touch inducer pad [4], in which a common touch inducer bus [15] of the touch inducer pad [4] is connected by way of the electronic interface system to an output of the source system [2] and processes a received intelligibly modulated transmitted signal from the source system [2] to create the pixel gate packet [16] and deliver the pixel gate packet [16] in a proper protocol to an input of the touch inducer pad [4] which delivers the intelligible information to the human brain by stimulating the wearer's sense of touch in intelligible patterns within the area of skin or tongue, that is directly or indirectly, via the intermediate material, in contact with the skin contact surface [14] of each of the touch inducing pixels [3] within the touch inducer pad [4], the electronic interface system comprising:

an internal power supply [12] that provides electrical operating power to the electronic interface system, a common ground return [5] that is in common with a wearer's skin, the source system and the electronic interface system including the touch inducer pad [4], a receiver amplifier and transmitter [22], capable of simultaneously receiving and amplifying a plurality of discrete intelligibly modulated frequencies or a plurality of the receiver amplifiers and transmitters [22] each of which is capable of simultaneously receiving a discrete intelligibly modulated frequency, a respective local oscillator for R.F. to I.F. conversion and amplification [41] which when combined with the receiver amplifier and transmitter [22] constitutes a receiver processor and amplifier [7], the receiver amplifier and transmitter [22], capable of transmitting the discrete intelligibly modulated frequency corresponding with the discrete intelligibly modulated frequency it received, a clearest frequency selector [37], a digital detector and converter with demodulator and error detector [19] which is also referred to as a detector, demultiplexer and/or demodulator [8], a wearer's address comparator and gate [26], a touch duration and intensity decoder; and, touch voltage inserter [42], a timing oscillator [23], an external power supply [33]; and, a wearer's address selector [25];

wherein, these component parts of the electronic interface system are constructed with electrical characteristics, physical characteristics, connections or relationships as follows:

the internal power supply [12] is constructed as an integral part of the electronic interface system and supplies operating power to the electronic interface system;

a means of providing the connectivity for the common ground return [5] that is in common with the wearer's skin, the electronic interface system including the touch inducer pad [4], and the source system [2], which specifically includes but is not limited to an electrical conductor or a plurality of electrical conductors to electrically connect to the common ground return [5] that is maintained directly or indirectly, via the intermediate material, in constant contact with the skin of the wearer of the electronic interface system by affixing the common ground return [5] to the skin of the wearer by any means, specifically including but not limited to adhesives or by mechanically or physically holding the common ground return [5] directly or indirectly, via the intermediate material, in constant contact with the skin of the wearer;

the receiver amplifier and transmitter [22], capable of simultaneously receiving and amplifying the plurality of the discrete intelligibly modulated frequencies or the plurality of the receiver amplifier and transmitters [22] each of which is capable of simultaneously receiving the discrete intelligibly modulated frequency, receives the discrete intelligibly modulated frequencies from the source system [2] and receives a gate command [39], from the clearest frequency selector [37], which gates on or off any number of the receiver amplifiers and transmitters [22] which transmits its amplified output to the respective local oscillator for R.F. to I.F. conversion and amplification [41];

each of the respective local oscillator for R.F. to I.F. conversion and amplification [41], receives its input respectively from the receiver amplifier and transmitter [22], capable of simultaneously receiving and amplifying the plurality of the discrete intelligibly modulated frequencies or the plurality of the receiver amplifier and transmitters [22] each of which is capable of simultaneously receiving the discrete intelligibly modulated frequency and converts a radio frequency (R.F.) [17] to an intermediate frequency (I.F.) [18] to better facilitate amplification by the respective local oscillator for R.F. to I.F. conversion and amplification [41] and when the intermediate frequency (I.F.) [18] output is delivered to the input of the clearest frequency selector [37], the conversions to the intermediate frequencies (I.F.) [18] better facilitates processing by both the clearest frequency selector [37], and the digital detector and converter with demodulator and error detector [19];

the receiver amplifier and transmitter [22], capable of transmitting the discrete intelligibly modulated frequency corresponding with the discrete intelligibly modulated frequency it received, having that frequency which is selected, by the clearest frequency selector [37], to be a clearest frequency available for the source system [2] to use for the transmission of a received information packet [24] next to be sent, receives the gate command [39] to transmit the clearest frequency selected, along with a wearer's address code [27] for confirmation, to the source system [2] to inform the source system [2] of the clearest frequency for the source system [2] to use for the transmission of the received information packet [24] next to be sent; then, after that receipt of the received information packet [24], if either the received information packet [24] is found to have the wearer's address code [27] that is wrong or to contain errors detected by the digital detector and converter with demodulator and error detector [19], then a request to retransmit (RTR) command [21]; along with the wearers address code [27] for confirmation, is delivered to the clearest frequency selector [37] and respectively to the receiver amplifier and transmitter [22] and the source system [2] causing the entire process of transmitting the received information packet [24] to be repeated until a packet receipt command [20], indicating confirmation that the received information packet [24] was received without errors and contained the wearer's address code [27] that is correct, is generated and is delivered, along with the wearers address code [27] for confirmation, to the clearest frequency selector [37] and respectively to the receiver amplifier and transmitter [22] and the source system [2] causing the entire process to be repeated to transmit the received information packet [24] next due to be sent;

the clearest frequency selector [37] receives, at its input, the intermediate frequency (I.F.) [18] outputs from the respective local oscillator for R.F. to I.F. conversion and amplification [41], then the clearest frequency selector [37] gates on all the receiver amplifiers and transmitters [22] receiver frequencies simultaneously so that it can compare and analyze all of the intermediate frequency (I.F.) [18] inputs simultaneously and select the clearest frequency available at that moment so that it can gate off by way of the gate commands [39] all the receive frequencies except for the clearest frequency and then direct the transmitter corresponding to the clearest frequency to transmit the clearest frequency, along with the wearer's address code [27] for confirmation, to the source system [2] to inform the source system [2] of the clearest frequency for the source system [2] to use for the transmission of the received information packet [24] next due to be sent and then the clearest frequency selector [37] sends its output of an intermediate frequency (I.F.) of clearest radio frequency (R.F.) [38] that is the clearest to the input of the digital detector and converter with demodulator and error detector [19];

the digital detector and converter with demodulator and error detector [19], receives the intermediate frequency (I.F.) of clearest radio frequency (R.F.) [38] from the clearest frequency selector [37] then processes the intermediate frequency (I.F.) of clearest radio frequency (R.F.) [38] by demultiplexing and demodulating the intermediate frequency (I.F.) of clearest radio frequency (R.F.) [38] in order to detect and recover the digital information containing the received information packet [24] and after checking the received information packet [24] for errors, either generates and sends the request to retransmit (RTR) command [21] back towards the source system [2] if errors are detected or conversely, if no errors are detected, sends the received information packet [24] to the input of the wearer's address comparator and gate [26] and additionally, generates and sends the packet receipt command [20] back towards the source system [2];

the wearer's address comparator and gate [26], receives the received information packet [24] from the digital detector and converter with demodulator and error detector [19], compares the wearer's address code [27] received with the wearer's address code [27] in the wearer's address comparator and gate [26] and if a match is found, sends the received information packet [24] to the input of the touch duration and intensity decoder; and, touch voltage inserter [42]; additionally, the wearer's address comparator and gate [26] transmits the wearer's address code [27], in the wearer's address comparator and gate [26], back to the clearest frequency selector [37] where it is subsequently included with other commands being transmitted back to the source system [2] for use by the source system [2] to confirm that the command was transmitted by the intended wearer;

the touch duration and intensity decoder; and, touch voltage inserter [42] receives the received information packet [24] from the wearer's address comparator and gate [26], then decodes a touch stimulation duration code, a touch stimulation intensity code, and a pixel address coded number [11] then processes and uses the decoded information to create the address of the touch inducing pixel [3] followed by a touch stimulation voltage [29] at the intensity specified by the touch stimulation intensity code and for the duration specified by the touch stimulation duration code all of which are transmitted by way of electrical conductors to the input of the touch inducer pad [4];

the timing oscillator [23] works with the digital detector and converter with demodulator and error detector [19] to improve the accuracy of the received information packet [24] wherein the recovery of the received information packet [24] data is either-synchronous or asynchronous and the received information packet [24] includes a packet start code and a packet stop code or does not include the packet start code and the packet stop code;

the external power supply [33] which is connected to the electronic interface system and used to augment the internal power supply [12] for the purpose of extending the period of time over which the electronic interface system can operate; and/or, for the purpose of recharging the internal power supply [12];

the wearer's address selector [25] provides the wearer with the capability of selecting and changing the wearer's address code [27] to which the wearer's address code [27] in the source system [2] is compared for the purpose of ensuring that the received information packet [24] is delivered only to the addressed wearer and for the purpose of providing the capability for any number of wearer's to operate in close physical proximity to each other without encountering accidental and/or intentional interference, jamming and/or deception by ensuring that only the received information packets [24] that contain the wearer's address code [27] that exactly matches the wearer's address code [27] set by the wearer's address selector [25] within the wearer's electronic interface system is delivered to the wearer's sense of touch; and, thus, when the electronic interface system is limited to the preceding, it lacks some components and functions that improve the comfort and ease of use by the wearer; however, the ergonomics of the electronic interface system can be improved by inclusion of those components and functions described in the following which is referred to in combination as a touch duration and intensity decoder; and, touch stimulation voltage inserter with maximum current selector and speed selector buffer [9] which consists of the touch duration and intensity decoder; and, touch voltage inserter [42] that receives its input from a touch stimulating pixel voltage supply [40] by way of a maximum current selector and regulator [28] by which the wearer selects the maximum regulated current to suit their personal preference which is then encoded into the pixel gate packet [16] output of the touch duration and intensity decoder; and, touch voltage inserter [42] that is sent to the input of a store and forward buffer [30] which also receives an input from a wearer's speed adjuster [31] having controls that provide the wearer with the capability to adjust the speed at which the store and forward buffer [30] releases its output to the common touch inducer bus [15] thereby permitting the wearer to adjust the reading speed to suit his/her personal reading skill and lastly the maximum current selector and regulator [28] that is adjusted by the wearer provides the wearer with the touch stimulating voltage [29] that is current regulated to compensate for variations in the resistance between the skin contact surface [14] of the touch inducing pixel [3] that is addressed in the touch inducer pad [4] and the skin that is directly or indirectly, via the intermediate material, in contact with the skin contact surface [14] of the touch inducing pixel [3] that is addressed in the touch inducer pad [4].

* * * * *